(12) United States Patent
Nishida

(10) Patent No.: US 10,817,646 B2
(45) Date of Patent: Oct. 27, 2020

(54) INFORMATION PROCESSING SYSTEM AND CONTROL METHOD THEREFOR

(71) Applicant: CANON KABUSHIKI KAISHA, Tokyo (JP)

(72) Inventor: Takahiko Nishida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 128 days.

(21) Appl. No.: 15/674,078

(22) Filed: Aug. 10, 2017

(65) Prior Publication Data

US 2018/0081860 A1 Mar. 22, 2018

(30) Foreign Application Priority Data

Sep. 16, 2016 (JP) .................. 2016-181938

(51) Int. Cl.
| | |
|---|---|
| G06F 17/00 | (2019.01) |
| G06F 40/103 | (2020.01) |
| G06Q 10/10 | (2012.01) |
| G06F 40/151 | (2020.01) |
| G06F 40/174 | (2020.01) |
| G06Q 30/00 | (2012.01) |
| H04L 29/08 | (2006.01) |
| H04L 29/06 | (2006.01) |

(52) U.S. Cl.
CPC .......... *G06F 40/103* (2020.01); *G06F 40/151* (2020.01); *G06F 40/174* (2020.01); *G06Q 10/10* (2013.01); *G06Q 30/01* (2013.01); *H04L 67/02* (2013.01); *H04L 67/42* (2013.01)

(58) Field of Classification Search
CPC ............... G06F 17/2264; G06F 17/243; G06F 17/3089; G06F 40/103
See application file for complete search history.

(56) References Cited

U.S. PATENT DOCUMENTS

| | | | |
|---|---|---|---|
| 8,122,344 B2 | 2/2012 | Halahmi | |
| 8,839,098 B2 | 9/2014 | Halahmi | |
| 2001/0047373 A1* | 11/2001 | Jones | .................... G06F 40/106 715/210 |

(Continued)

FOREIGN PATENT DOCUMENTS

| | | |
|---|---|---|
| JP | 2003-525492 A | 8/2003 |
| JP | 2005-235108 A | 9/2005 |

(Continued)

OTHER PUBLICATIONS

Japanese Office Action dated Sep. 4, 2020 in corresponding Japanese Patent Application No. 2016181938.

*Primary Examiner* — Andrew T McIntosh

(74) *Attorney, Agent, or Firm* — Venable LLP

(57) ABSTRACT

A filled-in form service generates PDF files each containing a smaller number of pages by overlay output, instead of a single PDF file containing all pages. The filled-in form service updates an overlay index file indicating a location of each generated PDF file each time a PDF file is generated. A conversion service references the overlay index file, and successively converts newly generated PDF files into SVG. The conversion service updates a conversion index file indicating a location of each SVG file each time a SVG file is generated. A client terminal references the conversion index file, and displays, on a screen, web filled-in form data that is the generated SVG file.

5 Claims, 11 Drawing Sheets

(56) References Cited

U.S. PATENT DOCUMENTS

| | | | |
|---|---|---|---|
| 2002/0147788 A1* | 10/2002 | Nguyen | G06F 17/30902 709/217 |
| 2003/0023637 A1 | 1/2003 | Halahmi | |
| 2003/0056139 A1* | 3/2003 | Murray | G06F 11/1451 714/4.1 |
| 2005/0246643 A1* | 11/2005 | Gusmorino | G06F 3/0481 715/734 |
| 2006/0174198 A1* | 8/2006 | Brown | G06F 17/30864 715/205 |
| 2012/0131449 A1* | 5/2012 | Halahmi | G07F 15/00 715/249 |
| 2012/0233532 A1* | 9/2012 | Rickabaugh | G06F 17/2247 715/209 |
| 2015/0006540 A1* | 1/2015 | Martens | G11B 27/031 707/741 |

FOREIGN PATENT DOCUMENTS

| | | |
|---|---|---|
| JP | 2009-211165 A | 9/2009 |
| JP | 2012-018576 A | 1/2012 |
| JP | 2016-162190 A | 9/2016 |
| WO | 01/065355 A1 | 9/2001 |

\* cited by examiner

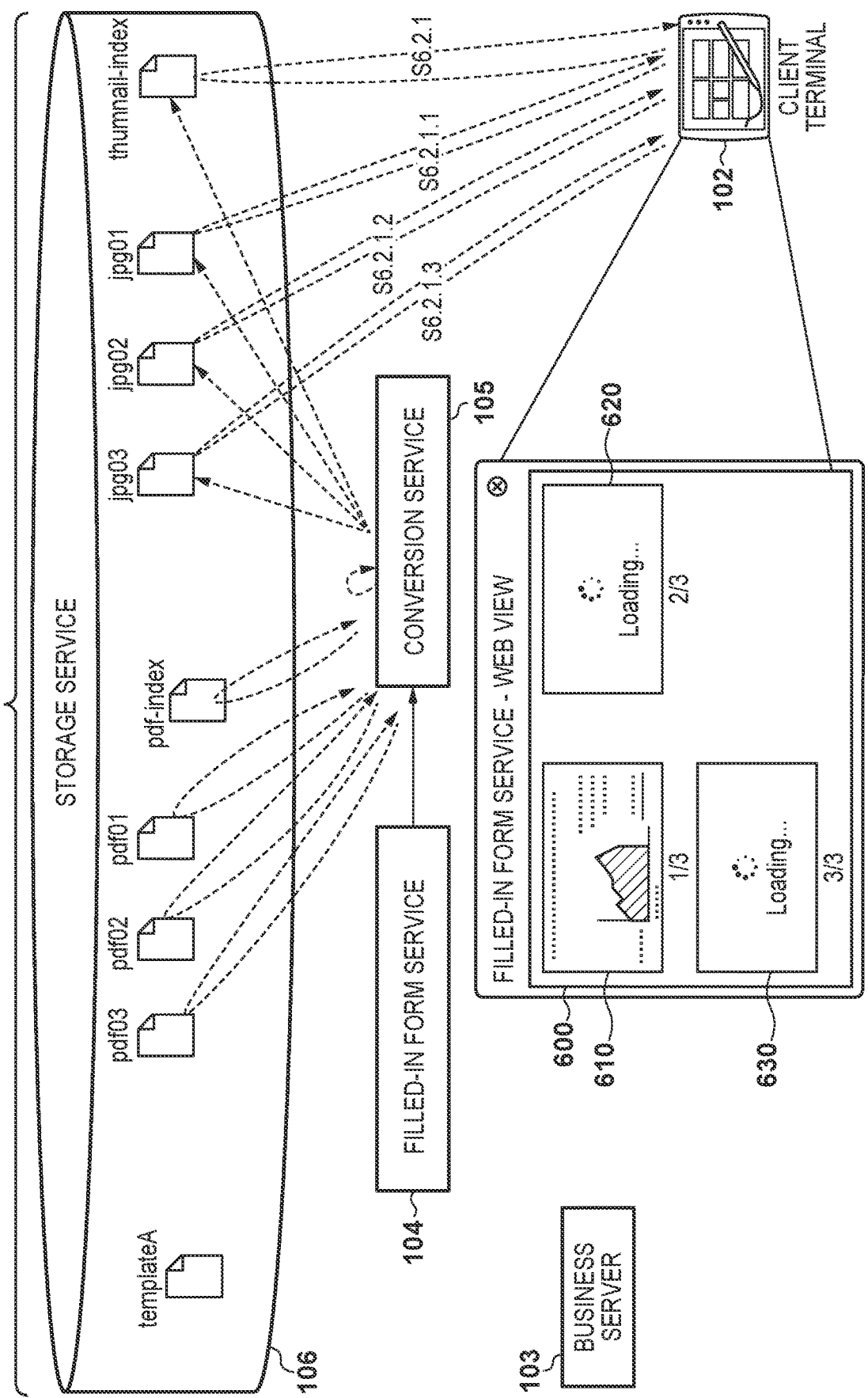

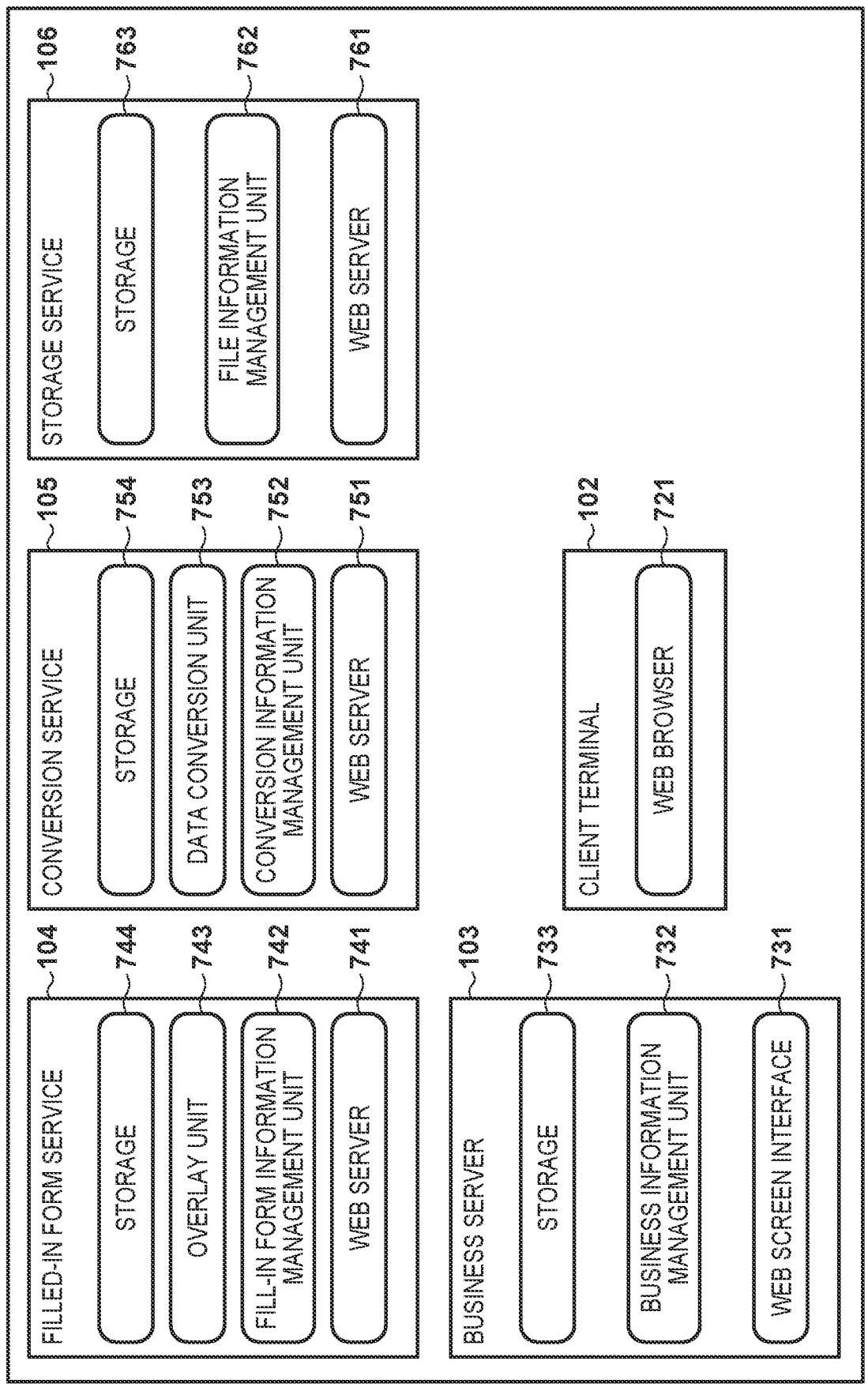

INFORMATION PROCESSING SYSTEM AND CONTROL METHOD THEREFOR

BACKGROUND OF THE INVENTION

Field of the Invention

The present invention relates to information processing systems and control methods therefor. More particularly, the present invention relates to information processing systems that involve generation and displaying of filled-in form document data in cloud services, and control methods therefor.

Description of the Related Art

Recently, more and more offices have replaced paper-based information with document data in order to eliminate the use of paper and thereby increase business efficiency and save resources. For example, this is true for business filled-in form documents dealt with in offices. In particular, mission-critical systems often print out a huge number of pages of filled-in forms, resulting in a huge operating cost. Therefore, filled-in forms have been increasingly dealt with in electronic formats. The use of cloud services is getting widespread for management and various processes of business data. A user accesses a website of a cloud service from a web browser on a client terminal through the Internet, and browses filled-in form document data in an electronic format on the website. It is also expected that filled-in form document data browsed in accordance with a workflow will be more frequently edited and printed out. Therefore, it is foreseen that when filled-in form document data is dealt with on a website, data in the Scalable Vector Graphics (SVG) format, which has high affinity to the web, or the like, is used instead of data in the Portable Document Format (PDF) format, which has been traditionally and widely used in filled-in form systems. As a result, web filled-in forms can be provided that have advantages which are difficult to achieve on conventional filled-in form document data, such as dynamic representations, and graphics that do not deteriorate even when the screen is enlarged or reduced.

Meanwhile, in cloud services, filled-in form document data is generated in the PDF format from customer data and template data, and thereafter, it is necessary to convert the filled-in form document data in the PDF format into a format suitable for a website, such as SVG or the like. Therefore, it takes a long time to convert filled-in form document data, and therefore, particularly, when there are a large number of pages of business filled-in forms, a user disadvantageously needs to wait for a long time until they can browse the business filled-in forms on a website after the generation of the business filled-in forms.

To address these problems, a technique for use in a system for converting documents has been proposed for receiving and displaying document data portion by portion in such a manner that each portion is received and displayed immediately after that portion has been converted, instead of waiting for the conversion of the entire document and then the transmission of the resultant data (see, for example, Japanese Patent Laid-Open No. 2003-525492).

However, in the technique of Japanese Patent Laid-Open No. 2003-525492, existing document data is converted and received portion by portion. This technique is less effective in a process including a plurality of steps, such as generation and conversion of filled-in form document data. For example, after the generation of filled-in form document data is completed, the conversion of the data into a web-compatible format is started, and each portion of the data is received and displayed by a client terminal immediately after that portion has been converted, without waiting for the completion of the entire data. In this case, when there are a huge number of pages of business filled-in forms, it takes a long time to complete the generation of filled-in form document data, i.e., it is long before the start of the conversion, and therefore, a user needs to wait for a long time.

SUMMARY OF THE INVENTION

The present invention provides a document processing system in which a period of time for which a user waits until the displaying of a web filled-in form is started after the user requests generation of the filled-in form on a website, in a cloud service, can be reduced, and a control method therefor.

According to the first aspect of the present invention, there is provided an information processing system comprising: a document generation service configured to generate document data in a first format to be processed, on a per predetermined processing unit basis; a conversion service configured to convert the document data in the first format generated by the document generation service into document data in a second format, on the processing unit basis; and a client configured to obtain the document data in the second format provided by the conversion service, on the processing unit basis.

According to the second aspect of the present invention, there is provided a method for controlling an information processing system including a document generation service, a conversion service, and a client, the method comprising: the document generation service generating document data in a first format to be processed, on a predetermined processing unit basis; the conversion service converting the document data in the first format generated by the document generation service into document data in a second format, on the processing unit basis; and the client obtaining the document data in the second format provided by the conversion service, on the processing unit basis.

According to the present invention, a period of time for which a user waits until the displaying of a web filled-in form is started after the user requests generation of the filled-in form on a website can be reduced.

Further features of the present invention will become apparent from the following description of exemplary embodiments with reference to the attached drawings.

BRIEF DESCRIPTION OF THE DRAWINGS

FIG. 6 is a flow diagram showing a thumbnail image displaying process.

FIG. 7 is a diagram showing a software configuration.

DESCRIPTION OF THE EMBODIMENTS

Embodiments for carrying out the present invention will now be described with reference to the accompanying drawings.

<System Configuration>

Figure 1:
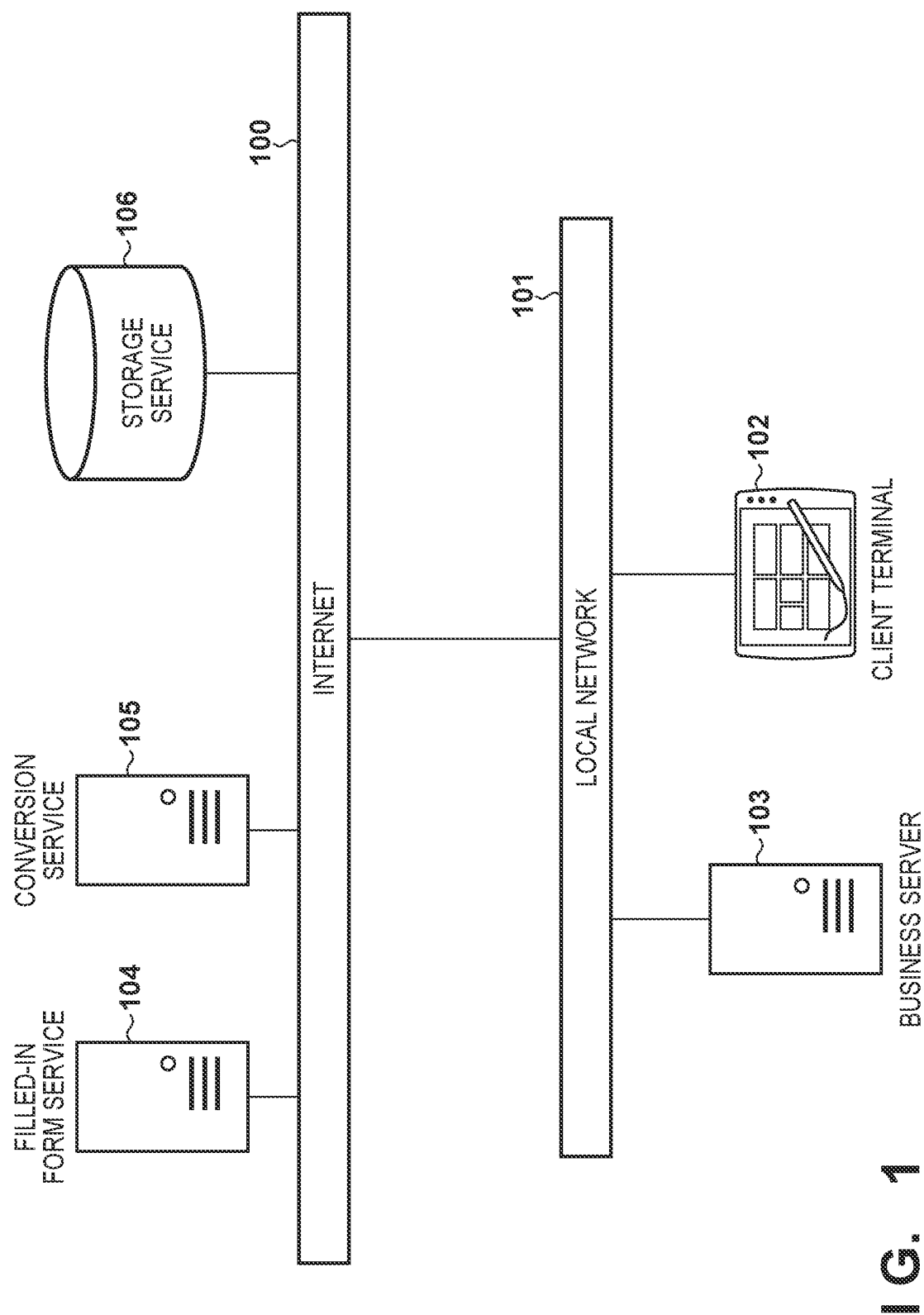
FIG. 1 is a diagram showing a system configuration.

FIG. 1 is a diagram showing the entire configuration of a filled-in form system (or an information processing system) according to an embodiment of the present invention. In FIG. 1, a client terminal 102 is coupled to a local network 101 through a wired or wireless LAN, and can access the Internet 100 through the local network 101 to access services 104-106. The client terminal 102 includes, for example, a desktop personal computer, laptop personal computer, smartphone, tablet personal computer, or the like. The client terminal 102 includes system requirements for executing programs, such as a web browser (the Internet browser, a WWW browser, a browser for using the World Wide Web, etc.) and the like.

A business server 103 manages user business information. In this example, a use case is assumed in which the business server 103 manages the business information, and a salesperson performs sales activity with respect to a customer using the information of the business server 103. The business server 103 provides a screen for displaying business information and instructing to generate filled-in form data, in response to a request from the client terminal 102.

The service 104 is a filled-in form service for receiving the business information from the business server 103, and generating a filled-in form PDF file on the basis of the business information using a form template, and managing the filled-in form PDF file. The filled-in form service 104 requests a conversion service 105 to convert the generated filled-in form PDF file. The service 105 is a conversion service for receiving the request to convert a filled-in form PDF file, from the filled-in form service 104, and converting the filled-in form PDF file into another format such as SVG or the like to generate web filled-in form data. Although, in this example, the format (first format) of filled-in form data is the PDF format, and the format (second format) of web filled-in form data is SVG, these types of data may be in other suitable formats. The generated data is not limited to filled-in form data, and may be other document data. In this case, for example, the term "document generation service" or "generation service" may be used instead of the term "filled-in form service."

The service 106 is a storage service for managing files, and receiving files uploaded or downloaded from the client terminal 102, the filled-in form service 104, and the conversion service 105. Although the services 104-106 and the business server 103 are each represented by a single entity, or alternatively, may each be implemented using a plurality of servers for redundancy. Conversely, a plurality of services may be provided using a single server. In this example, a method will be described which is initiated or started by a filled-in form preview request from the client terminal 102, and then performs the generation of filled-in form data on the filled-in form service 104, the conversion into web filled-in form data on the conversion service 105, and finally the reception and displaying of the web filled-in form data on the client terminal 102. It is assumed that the business server 103 previously stores business information data, and the filled-in form service 104 previously stores a form template corresponding to customer data, as information for generating filled-in form data.

<Hardware Configuration>

Figure 2:
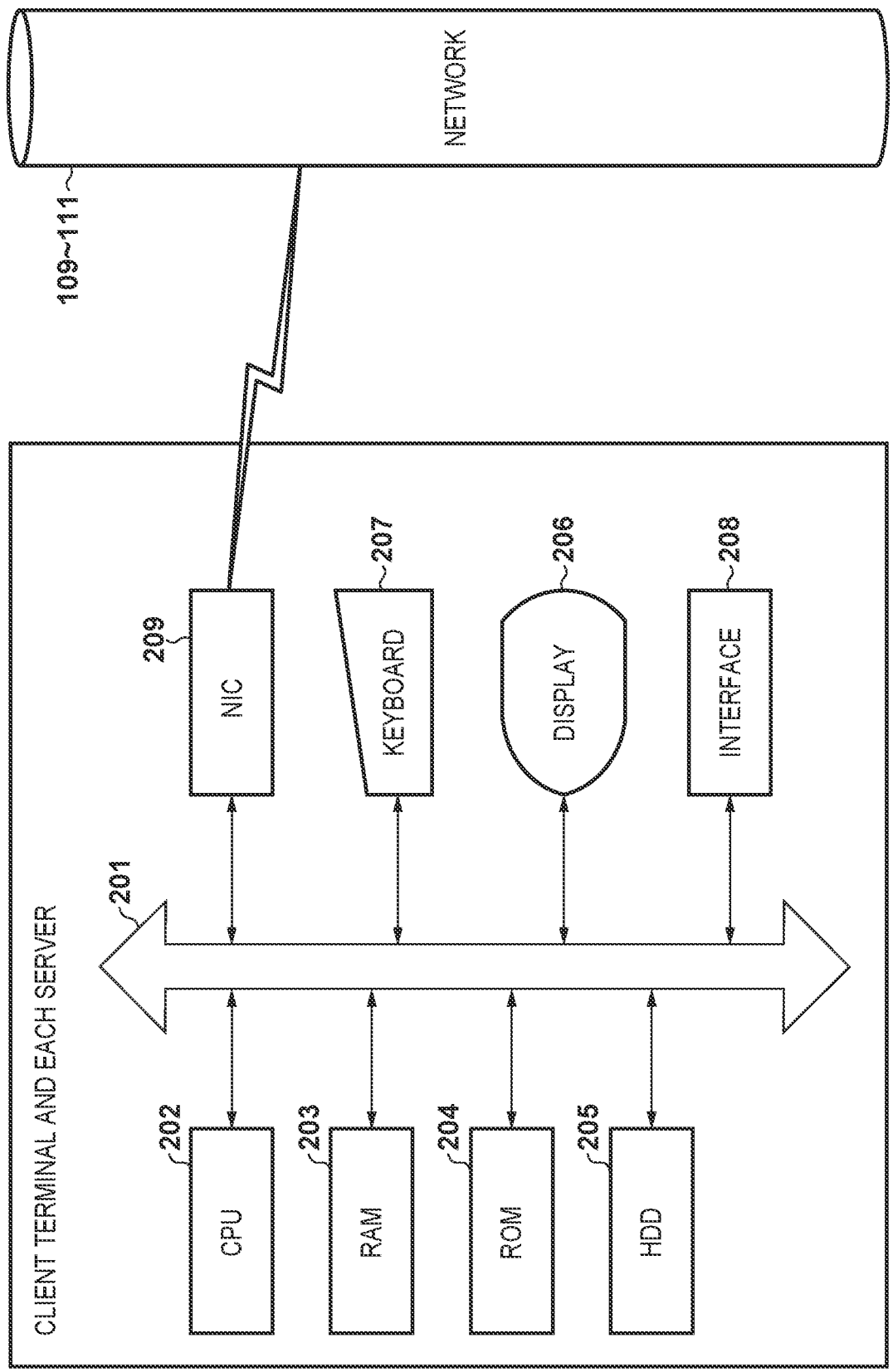
FIG. 2 is a diagram showing a hardware configuration of each apparatus.

FIG. 2 is a block diagram showing a hardware configuration of an information processing apparatus (or a computer) that serves as a server or client that provides a service. In FIG. 2, a CPU 202 controls the entire apparatus. The CPU 202 performs control to execute an application program, OS, etc., that are stored in a hard disk (HDD) 205, and temporarily store, in a RAM 203, information, a file, etc., that are required for execution of the program. A ROM 204, which is a storage means, stores therein programs such as a basic I/O program and the like, print data that is used in a printing process, and various pieces of data such as printer information and the like. The RAM 203, which is a temporary storage means, serves as a main memory, work area, etc., for the CPU 202. The HDD 205, which is an external storage means, serves as a mass memory. The HDD 205 stores application programs, such as a web browser and the like, various server programs, an OS, various drivers, related programs, and the like. A display 206, which is a displaying means, displays a command input from a keyboard 207, an output screen of each application, and the like. An external device interface 208 is used to couple a USB device or other peripheral devices. The keyboard 207 is an instruction input means. A system bus 201 transfers data in each of the client terminal 102, the business server 103, and the services 104-106. A network interface card (NIC) 209 is used together with the networks 100 and 101 for data exchange with an external device. Note that the computer configuration of FIG. 2 is merely for illustrative purposes, and the present invention is not limited to the example configuration of FIG. 2. For example, the place where data or a program is stored may be changed between the ROM, RAM, HDD, and the like, depending on the properties of the data or program.

<Software Configuration and Management Information of Business Server 103>

Next, a software configuration of the client terminal 102, the servers, and the services, which are shown in FIG. 1 and are used to carry out this example, and management information dealt with by each entity, will be described with reference to FIG. 7.

The business server 103 has a web screen interface 731, a business information management unit 732, and a storage 733. Each software module is stored in the HDD 205 of FIG. 2, and is loaded into the RAM 203 and then executed by the CPU 202. The web screen interface 731, which serves as a user interface for the business server 103, generates a screen for displaying the business information managed by the business information management unit 732, in response to a request from a browser 721 of the client terminal 102, and sends the screen to the browser 721. The business information is stored in the storage 733 of the business server 103 and managed by the business information management unit 732 of the business server 103. These pieces of information may be stored in another server configured to communicate with the business server 103 through the Internet 100 or the local network 101, instead of an external memory for the business server 103. Of the business information previously stored and managed in the business information management unit 732, example customer information is shown in Table 1.

TABLE 1

Customer Information

| Customer ID | Name | Address | Birthday | Phone No. |
|---|---|---|---|---|
| 1 | Taro Chohyo | 1-2-3, B city, A prefecture | Jan. 1, 1989 | 090-9999-9999 |
| 2 | Hanako Chohyo | 2-3-4, D city, C prefecture | Feb. 2, 1990 | 080-1111-1111 |

The customer information is a data table that is used for generation of filled-in forms. In this example, a customer ID for uniquely identifying a customer, and information containing the name, address, birthday, and phone number of the customer, are stored in association with each other for each customer. Data that is used to generate filled-in forms is not limited to this example customer information, and may be product inventory or delivery information, financial transaction information, and other various kinds of information. Of the business information previously stored in the business information management unit 732, example unfilled-in form information is shown in Table 2.

TABLE 2

Unfilled-in Form Information

| Form ID | Name of form | Form template ID |
|---|---|---|
| form-001 | Customized plan A | template-001 |
| form-002 | Customized plan B | template-002 |

The unfilled-in form information is a data table for form templates that are used to generate forms. The unfilled-in form information contains a form ID for uniquely identifying form information, a form name to be displayed on a screen, and a template ID for identifying a form template managed in the filled-in form service 104, in association with each other. The business server 103 receives a filled-in form preview instruction from the browser 721 of the client terminal 102 through the web screen interface 731. Thereafter, the business information management unit 732 can request the filled-in form service 104 to generate a filled-in form by sending customer information of interest and a form template ID of interest in the unfilled-in form information to the filled-in form service 104.

<Software Configuration and Management Information of Filled-In Form Service 104>

The filled-in form service 104 has a web server 741, a filled-in form information management unit 742, an overlay unit 743, and a storage 744. Each software module is stored in the HDD 205 of FIG. 2, and is loaded into the RAM 203 and then executed by the CPU 202. The web server 741 provides various interfaces for the filled-in form service 104, and receives a request from at least one of the browser 721 of the client terminal 102 and the business server 103, and sends a response. The storage 744 of the filled-in form service 104 stores form template information and filled-in form data information, which are managed by the filled-in form information management unit 742. Example form template information that is managed by the filled-in form information management unit 742 and is stored in the storage 744 is shown in Table 3.

TABLE 3

Form Template Information

| Form template ID | Form template URL |
|---|---|
| template-001 | https://storage.com/templates/template-001 |
| template-002 | https://storage.com/templates/template-002 |

The form template information is a data table for form templates that are managed by the filled-in form service 104. In this example, the data of each form template is stored as a file in the storage service 106 described below. The form template information contains a URL for obtaining the data. A form template ID is used to uniquely identify a form template that is managed in the filled-in form service 104, and corresponds to a form template ID in the unfilled-in form information, which is managed in the business server 103. The filled-in form service 104, when receiving a filled-in form generation request from the business server 103 through the web server 741, instructs the overlay unit 743 to perform overlay output on the basis of customer information and a form template ID contained in the filled-in form generation request.

Here, typical overlay output will be described. Overlay output means that form information containing information about, for example, lines of ruled paper or the like, and text data (referred to as field data), are printed in combination, i.e., in such a manner that the form information and the text data are overlaid with each other. A function called "stored page" or "stored form," which is possessed by a page printer, such as a laser printer or the like, is used to previously store form information. When a page printer is used to print form information together with field data, a function called "page information call" or "form information call" can be used to print the form information and the field data in combination, i.e., in such a manner that the form information and the text data are overlaid with each other. This combination printing is called "overlay output." By using a virtual printer, the result of overlay output can be output as an electronic file instead of being printed on paper.

In this example, form information is previously contained in form template data, and customer information that is managed by the business server 103 is used as field data. The overlay unit 743 accesses a form template URL of interest in the form template information to obtain form template data from the storage service 106, retrieves form information from the form template data, and overlay-outputs the form information together with customer information of interest into a PDF file.

The filled-in form information management unit 742 of the filled-in form service 104 manages the output filled-in form PDF file together with an overlay index file (described below) that indicates information about the filled-in form PDF file, on the storage service 106. The filled-in form information management unit 742 of the filled-in form service 104 also requests the conversion service 105 to convert the output filled-in form PDF file into web filled-in form data by transmitting information about the output filled-in form PDF file to the conversion service 105. Example filled-in form data information that is managed by the filled-in form information management unit 742 and is stored in the storage 744 is shown in Table 4.

TABLE 4

Filled-in Form Data Information

| Overlay ID | Conversion ID | Conversion index file URL | Overlay index file URL |
|---|---|---|---|
| overlay-111 | convert-123 | https://storage.com/form/overlay-111/svg/index.json | https://storage.com/form/overlay-111/pdf/index.json |
| overlay-222 | convert- | | |
| overlay-333 | | | |

The filled-in form data information is a data table for filled-in form data that is managed by the filled-in form service 104. An overlay ID is issued by the filled-in form information management unit 742 when receiving a filled-in form generation request from the business server 103, and can be used to uniquely identify an overlay process. A conversion ID is issued by the conversion service 105 and is then received by the filled-in form service 104 as a response when the filled-in form service 104 sends, to the conversion service 105, a request for conversion into web filled-in form data, and can be used to uniquely identify a conversion process. A conversion index file URL is used to obtain a conversion index file (described below) that is generated at the start of a conversion process performed by the conversion service 105. The filled-in form service 104 obtains information about a conversion process of interest by sending a query to the conversion service 105 using a conversion ID as a key. If the conversion process has already been started, the filled-in form service 104 receives a conversion index file URL as a response, and stores the conversion index file URL as the filled-in form data information. The conversion index file URL is transferred to the client terminal 102 through the filled-in form service 104, and is used to access web filled-in form data. An overlay index file URL is used to access an overlay index file stored in the storage service 106, and is used by the filled-in form service 104 to update the overlay index file. For example, the filled-in form service 104 may store filled-in form data in the same folder that is indicated by the overlay index file URL. In this case, the index file name at the end of the URL is replaced with the name of the filled-in form file.

<Software Configuration and Management Information of Conversion Service 105>

The conversion service 105 has a web server 751, a conversion information management unit 752, a data conversion unit 753, and a storage 754. Each software module is stored in the HDD 205 of FIG. 2, and is loaded into the RAM 203 and then executed by the CPU 202. The web server 751 provides various interfaces for the conversion service 105, and receives a data conversion request and a conversion process information request from the filled-in form service 104, and sends a response to the filled-in form service 104. The storage 754 of the conversion service 105 stores conversion data information. Example conversion information that is managed by the conversion information management unit 752 and is stored in the storage 754 is shown in Table 5.

TABLE 5

Conversion Information

| Conversion ID | Overlay index file URL | Conversion index file URL |
|---|---|---|
| convert-123 | https://storage.com/form/overlay-111/pdf/index.json | https://storage.com/form/overlay-111/svg/index.json |

TABLE 5-continued

Conversion Information

| Conversion ID | Overlay index file URL | Conversion index file URL |
|---|---|---|
| convert-234 | https://storage.com/form/overlay-234/pdf/index.json | https://storage.com/form/overlay-234/svg/index.json |
| convert-345 | https://storage.com/form/overlay-345/pdf/index.json | |

The conversion information is a data table for conversion processes that are managed by the conversion information management unit 752. A conversion ID is issued by the conversion information management unit 752 when the web server 751 receives a conversion request from the filled-in form service 104, and can be used to uniquely identify a conversion process. An overlay index file URL is received when a conversion request is received from the filled-in form service 104, and is used to access an overlay index file (described below) indicating information about a file to be converted. A conversion index file URL is used to access a conversion index file (described below) that is generated when the data conversion unit 753 starts a conversion process. The data conversion unit 753 obtains and references an overlay index file, obtains data to be converted that is described therein, and converts the data, and updates the conversion index file, on a regular basis. When the conversion service 105 receives a conversion information obtaining request with a conversion ID as a key from the filled-in form service 104 through the web server 751, the conversion information management unit 752 extracts and sends corresponding conversion information to the filled-in form service 104.

<Software Configuration and Management Information of Storage Service 106>

The storage service 106 has a web server 761, a file information management unit 762, and a storage 763. Each software module is stored in the HDD 205 of FIG. 2, and is loaded into the RAM 203 and then executed by the CPU 202. The web server 761 provides various interfaces for the storage service 106. The file information management unit 762 manages file information, and exchanges a file in response to a request received through the web server 761. The storage 763 stores file information, and a file received by the storage service 106. Example file information that is managed by the file information management unit 762 is shown in Table 6.

TABLE 6

File Information

| Data URL | File path |
|---|---|
| https://storage.com/form/overlay-111/pdf/index.json | /form/overlay-111/pdf/index.json |
| https://storage.com/form/overlay-234/pdf/index.json | /form/overlay-234/pdf/index.json |
| https://storage.com/form/overlay-345/pdf/index.json | /form/overlay-345/pdf/index.json |
| https://storage.com/form/overlay-111/svg/index.json | /form/overlay-111/svg/index.json |
| https://storage.com/form/overlay-234/svg/index.json | /form/overlay-234/svg/index.json |

The file information is about a file stored in the storage service 106, and is managed by the file information management unit 762. A data URL can be used to uniquely identify a file stored in the storage service 106. A file path indicates a place where a file is stored in the storage. A request for a data URL is received by the web server 761, the file information management unit 762 updates corresponding file information on the basis of a corresponding file path, and performs a file operation on the storage 763. For example, a client can request the HTTP GET method with respect to a data URL to download a corresponding file. A client can also request the HTTP PUT method with an attached file with respect to a data URL to update and store a file. A client also can request the HTTP DELETE method with respect to a data URL to delete a file. A data URL contains, for example, an overlay index file. A conversion index file URL is used to access a conversion index file (described below) that is generated when the data conversion unit 753 starts a conversion process. Note that the conversion index file URL may not be separated, and may be included in a data URL and stored and managed together with the data URL.

<Overlay Index File and Conversion Index File>

Next, an overlay index file and a conversion index file that are generated or subsequently updated when the filled-in form service 104 performs overlay and when the conversion service 105 performs conversion, respectively, will be described. Note that features common to the overlay index file and the conversion index file are collectively described, and in this case, the overlay index file and the conversion index file are collectively referred to as index files. An index file indicates a place where a file itself, such as a data file in the PDF or SVG format, is located or stored. The place where an index file is located is indicated by an index file URL.

Figure 3:
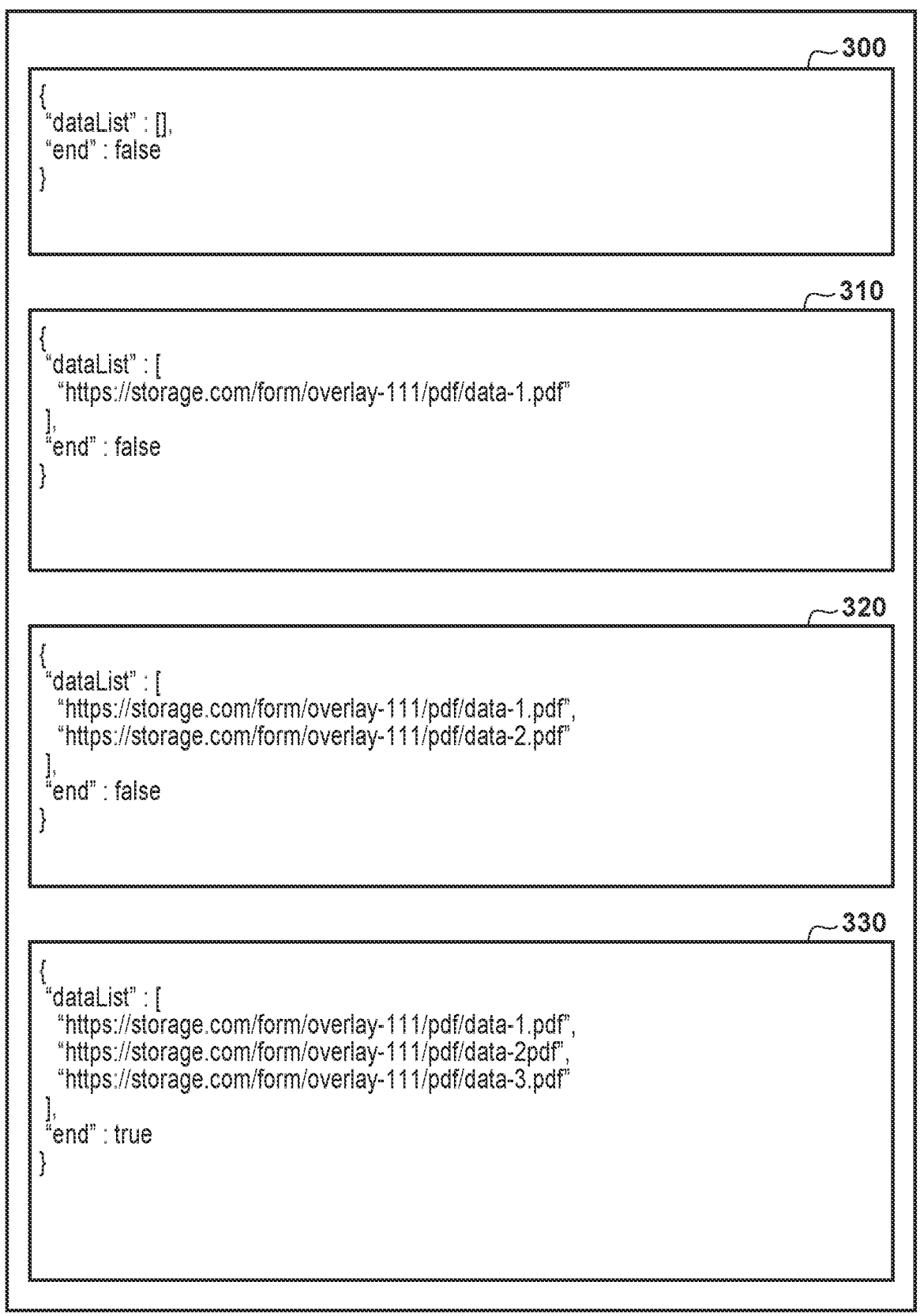
FIG. 3 is a diagram showing transition of an index file.

FIG. 3 shows example index files 300-330 in chronological order, which are generated or updated when the filled-in form service 104 and the conversion service 105 perform an overlay output process and a data conversion process, respectively. Initially, the filled-in form service 104 and the conversion service 105 each generate an index file on the storage service 106 at the start of the respective process (300). In this example, the index file is in the JSON file format, and includes a list of data URLs resulting from a process using a "dataList" as a key, and a process completion flag using an "end" as a key. Note that JSON (JavaScript (registered trademark) Object Notation) is one of the data description languages. Here, in this example, it is assumed that an overlay output result is a PDF file or files, and each PDF file corresponds to one page (file output unit). For example, three PDF files are output for a filled-in form having three pages. Note that the file output unit does not need to be one page, or alternatively, may be a fixed number of pages, a number of pages that is calculated from the number of all pages, or the like. The present invention is not limited to this if such an output scheme can be controlled by the overlay unit 743. The conversion process of the conversion service 105 is performed on a per PDF file output unit basis, where the PDF file output unit is the same as that for the overlay output result.

The filled-in form service 104 and the conversion service 105 each generate the index file 300 in an initial state at the start of the respective process. At this time, not a single file has been generated, and therefore, the "dataList" of the index file contains no data URL, and the value of the "end" indicating the process result is "false." Note that an index file URL can be specified at the time of generation of an index file, and therefore, can be written into the file information. Thereafter, the filled-in form service 104 and the conversion service 105 each successively perform the respective process, upload a resultant file to the storage service 106, and add the data URL of the file to the "dataList" of the index file. When the first file is uploaded, the index file 310 is obtained. When the second file is uploaded, the index file 320 is obtained. Thus, the data URL of an uploaded file is added to the "dataList" of the index file. The filled-in form service 104 and the conversion service 105 each also update the index file into the state of the index file 330 when a file resulting from processing the third file, i.e., the final page, is uploaded. In the index file 330, a data URL corresponding to the third file is added to the "dataList," and the process completion flag "end" is set to "true."

By obtaining the overlay index file from the storage service 106 and referencing it, the conversion service 105 can know the progress of overlay output performed by the filled-in form service 104, and start a conversion process on a PDF file on which the overlay output has been completed. Similarly, by obtaining the conversion index file from the storage service 106 and referencing it, the client terminal 102 can know the progress of a conversion process performed by the conversion service 105. Therefore, even when the conversion of the entire web filled-in form data has not been completed, one portion of web filled-in form data that has been converted can be downloaded and displayed before another portion has been converted. As a result, the time between the issuance of a filled-in form preview request on the browser of the client terminal 102 and the start of downloading and displaying of first web filled-in form data, can be reduced. In particular, when there are a huge number of pages of a filled-in form, the user waiting time can be significantly reduced.

<Sequence of Overlay Process>

Figure 4:
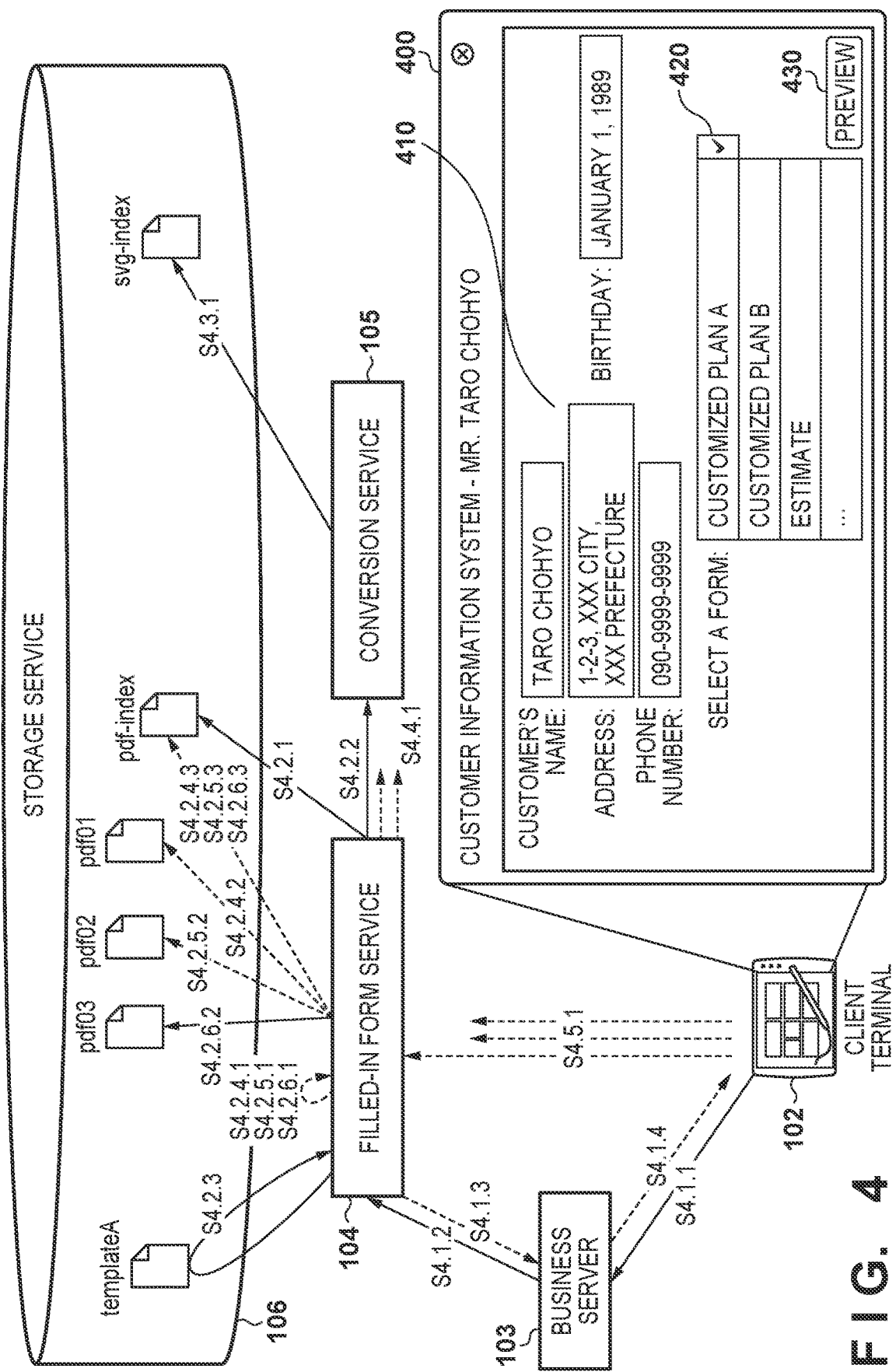
FIG. 4 is a flow diagram showing an overlay process.

A flow of each process in this embodiment will now be described. FIG. 4 is a flow diagram showing steps in this embodiment performed from when a filled-in form preview request is issued from a screen displayed on the client terminal 102, to when the filled-in form service 104 starts an overlay output process, and to when the filled-in form service 104 sends a conversion request to the conversion service 105. In FIG. 4, a web screen interface 400 displays customer information (410) that the browser 721 of the client terminal 102 has obtained by accessing the web screen interface 731 of the business server 103 using a customer ID as a key, and unfilled-in form information (420) stored in the business server 103. From a form selection drop-down list 420 contained in the web screen interface 400, the user can select one of items of unfilled-in form information registered therein. When a user presses down a filled-in form preview button 430, the browser 721 sends, to the business server 103, a filled-in form preview request containing the customer ID of the customer information being displayed, and the form ID of the unfilled-in form information selected from the form selection drop-down list 420.

In step S4.1.1, the browser 721 sends a filled-in form preview request to the business server 103. In step S4.1.2, the business information management unit 732 of the business server 103 sends, to the filled-in form service 104, a filled-in form generation request containing a customer ID contained in the filled-in form preview request, customer information corresponding to the customer ID, and a form template ID corresponding to a form ID.

The filled-in form service 104, when receiving the filled-in form generation request through the web server 741, issues and puts an overlay ID into the filled-in form data information using the filled-in form information management unit 742, and in step S4.1.3, sends the overlay ID as a response. In step S4.1.4, the business server 103 sends the overlay ID as a response to the filled-in form preview request from the browser 721 of the client terminal 102. In parallel with step S4.1.3, the filled-in form information management unit 742 of the filled-in form service 104 also obtains a form template URL from the form template information on the basis of the form template ID contained in the request, and sends an overlay output instruction together with the form template URL and the customer information to the overlay unit 743.

The overlay unit 743, when receiving the overlay output instruction, initially generates and uploads an overlay index file 300 to the storage service 106 in step S4.2.1. In step S4.2.2, the overlay unit 743 also sends a conversion request containing the data URL of the overlay index file 300 uploaded in step S4.2.1, to the conversion service 105. In step S4.2.3, the overlay unit 743 also accesses the form template URL to obtain form template data (template A), and starts an overlay process using the form template data (template A) in combination with the customer information. In step S4.2.4.1, the overlay unit 743 outputs a PDF file (pdf01) as a result of the overlay output, and then in step S4.2.4.2, uploads the PDF file (pdf01) to the storage service 106. The overlay unit 743 also uploads an overlay index file 310 in which the data URL of the uploaded PDF file has been added to the datalist, to the same data URL as that in step S4.2.1, and performs updating. Next, the overlay unit 743 similarly uploads an output result PDF file (pdf02) of the next overlay process step S4.2.5.1 to the storage service 106 in step S4.2.5.2, and uploads an updated overlay index file 320 to the storage service 106 in step S4.2.5.3. In step S4.2.6.1, an overlay process is performed on the final page unit. In step S4.2.6.2, the overlay unit 743 uploads an output result (pdf03) generated by the overlay process in step S4.2.6.1 to the storage service 106. Next, the overlay unit 743 adds the data URL of the file uploaded in step S4.2.6.2 to the datalist of the overlay index file to update the datalist, as in step S4.2.4.3 and step S4.2.5.3. In this case, the overlay unit 743 also updates the process completion flag with "true" that indicates the completion as shown in the overlay index file 330. In step S4.2.6.3, the overlay unit 743 uploads the overlay index file 330 to the storage service 106. If the overlay output unit is large, steps S4.2.5.1 and S4.2.5.2 are repeatedly performed.

Meanwhile, the conversion service 105, when receiving the conversion request in step S4.2.2, issues a conversion ID using the conversion information management unit 752, and sends the conversion ID as a response, and puts the conversion ID and the received overlay index file URL together into the conversion information. The conversion information management unit 752 also transfers the overlay index file URL to the data conversion unit 753, and sends a conversion instruction to the data conversion unit 753. The data conversion unit 753, when receiving the conversion instruction, generates a conversion index file (300) in an initial state, and in step S4.3.1, uploads the conversion index file (300) to the storage service 106, and puts the data URL of the conversion index file (300) into corresponding conversion information.

Here, the filled-in form service 104 obtains conversion information from the conversion service 105 using a conversion ID received as a response to the conversion request in step S4.2.2 as a key, on a regular basis (step S4.4.1). If there is a value in the conversion index file URL in the conversion information received as a response in step S4.4.1, the filled-in form service 104 updates a corresponding conversion index file URL in the filled-in form data information, and ends step S4.4.1.

In addition, after receiving the overlay ID in step S4.1.4, the browser 721 of the client terminal 102 sends a request for the filled-in form data information to the filled-in form service 104 on the basis of the overlay ID, on a regular basis (step S4.5.1). If there is a value in the conversion index file URL in the filled-in form data information obtained as a response to the request in step S4.5.1, the browser ends step S4.5.1, and starts obtaining the conversion index file. In this case, the contents of the conversion index file obtained by the browser 721 vary depending on the progress of a conversion process (described below) performed by the conversion service 105 in parallel, and are those of one of the index files 300-330 of FIG. 3.

<Sequence of Data Conversion Process>

Figure 5:
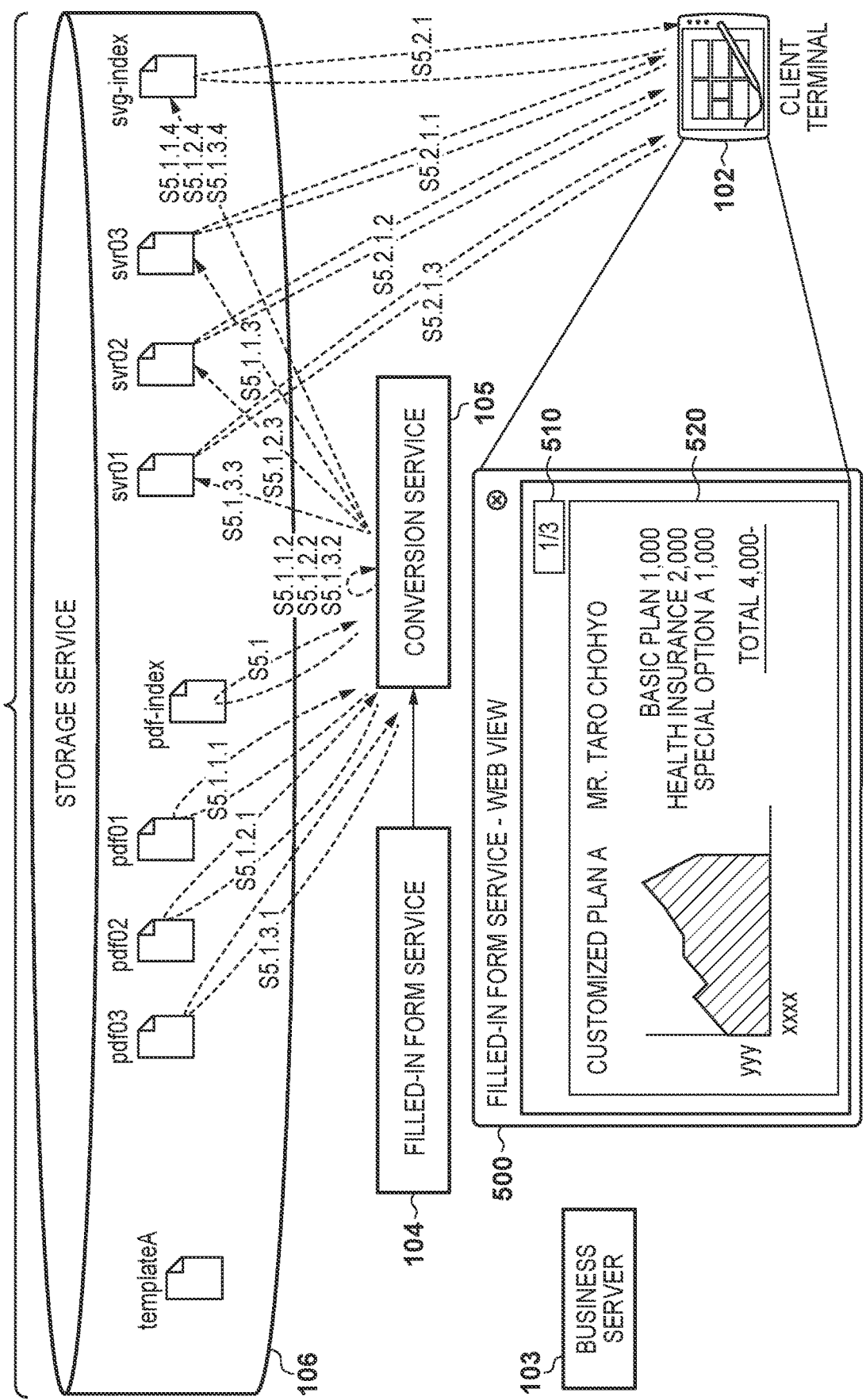
FIG. 5 is a flow diagram showing a data conversion process.

FIG. 5 is a flow diagram showing a process in this embodiment that is performed, after the sequence of FIG. 4, between when the conversion service 105 performs data conversion, and when the client terminal 102 obtains and displays web filled-in form data.

The conversion service 105 receives the conversion request of step S4.2.2 of FIG. 4, starts a conversion process using the data conversion unit 753, and in step S5.1, accesses an overlay index file URL contained in the conversion request and performs downloading on a regular basis. The data conversion unit 753 references an overlay index file downloaded in step S5.1. If there is the data URL of a PDF file that has been obtained by an overlay process in the datalist (e.g., the index file 310), the data conversion unit 753 obtains the PDF file (pdf01) from the data URL in step S5.1.1.1. In step S5.1.1.2, the data conversion unit 753 converts the PDF file into data in the web filled-in form format. In step S5.1.1.3, the data conversion unit 753 uploads the data (svg01) in the web filled-in form format obtained in step S5.1.1.2 to the storage 106. In step S5.1.1.4, the data conversion unit 753 uploads a conversion index file 310 in which the data URL of the file uploaded in step S5.1.1.3 has been added to the datalist, to the data URL of the file uploaded in step S4.3.1 of FIG. 4, and performs updating. Similarly, the data conversion unit 753 checks the overlay index file in step S5.1, and successively performs steps S5.1.2.1-S5.1.2.4 and steps S5.1.3.1-S5.1.3.4 on a URL in the updated datalist, on a regular basis. In step S5.1, if the process completion flag of the overlay index file has a value indicating the completion (e.g., the index file 330), the process completion flag of the conversion index file is updated with a value indicating the completion at step S5.1.3.4, in which the conversion process has been completed for all data URLs contained in the datalist.

Here, after obtaining a conversion index file URL in the filled-in form data information as a response in step S4.5.1 of FIG. 4, the browser 721 of the client terminal 102 accesses the conversion index file URL and downloads and references a conversion index file on a regular basis. If there is a URL in the datalist in step S5.2.1 (the index files 310, 320, and 330), the browser 721 downloads web filled-in form data from the data URL, and displays the web filled-in form data on a preview screen 500. In the browser 721, step S5.2.1 is ended when the process completion flag of a conversion index file (index file 330) is "true" that indicates the completion.

The preview screen 500 is obtained in step S5.2.1 and steps S5.2.1.1-S5.2.1.3 and displayed by the browser 721 of the client terminal 102. An image 520 is rendered from web filled-in form data obtained by the browser 721. Page numbering 510 indicates the total number of pages in the obtained web filled-in form data and the number of the currently displayed page, and varies depending on the progress of steps S5.2.1.1-S5.2.1.3.

In the flows of FIGS. 4 and 5, the states and contents of an overlay index file and a conversion index file are the initial conditions. The overlay process of the filled-in form service 104, the data conversion process of the conversion service 105, and the web filled-in form data displaying of the client terminal 102 can be performed in parallel.

After the filled-in form service 104 uploads an overlay index file in step S4.2.1, then when the process of the filled-in form data pdf01 is completed, the filled-in form service 104 adds a data URL (e.g., the index file 310) in step S4.2.4.3, and then starts the process of the filled-in form data pdf02. At this timing, the conversion service 105, which checks the overlay index file on a regular basis in step S5.1, detects the addition of the data URL of the filled-in form data pdf01, and starts the conversion process of converting the filled-in form data pdf01 into the web filled-in form data svg01 (steps S5.1.1.1-S5.1.1.4). When the process of the web filled-in form data svg01 is completed, the conversion service 105 adds the data URL of the web filled-in form data svg01 to the conversion index file in step S5.1.1.4, and then if the addition of the data URL of the filled-in form data pdf02 is detected in step S5.1, processes the filled-in form data pdf02, following pdf01. The client terminal 102 accesses the conversion index file URL obtained as a response in step S4.5.1 to check the conversion index file on a regular basis in step S5.2.1. A conversion index file URL can be obtained as a response in step S4.5.1 after the conversion service 105 generates a conversion index file in step S4.3.1, and then the filled-in form service 104 receives the conversion index file as a response in step S4.4.1. In other words, the client terminal 102 can start checking on a regular basis in step S6.2.1 after a conversion index file is uploaded in step S4.3.1. When the client terminal 102 detects the addition of the data URL of the web filled-in form data svg01 to the conversion index file in the checking in step S5.2.1, the client terminal 102 obtains and displays the data of the web filled-in form data svg01 on the preview screen 500 in step S5.2.1.1. Following the process of pdf01, the filled-in form service 104 processes pdf02 and pdf03, and updates the overlay index file on the basis of the progress of the process. Meanwhile, the conversion service 105 continues the checking in step S5.1, and then if the updating of the overlay index file is detected, performs the conversion process into svg02 and svg03, and updates the conversion index file on the basis of the progress of the conversion process. Similarly, the client terminal 102 continues the checking in step S5.2.1, and then if the updating of the conversion index file is detected, obtains and displays the data of svg02 or svg03 on the preview screen 500, depending on the contents of the conversion index file.

<Sequence of Thumbnail Presentation Process>

Finally, a thumbnail displaying process will be described. FIG. 6 is a flow diagram showing a process of displaying a thumbnail on a preview screen in this embodiment. A thumbnail is a reduced image having higher visibility, and in this example, refers to image data that is used when a list of pages of web filled-in form data is displayed on a preview screen. Conversion into a thumbnail image is started at the same timing of conversion into web filled-in form data, and is normally completed earlier because thumbnail images are less complicated.

As in the process of conversion into web filled-in form data, the conversion service 105 generates an index file for thumbnails, and generates a JPEG image as a thumbnail image. The rest of the process is similar to that of the conversion process of FIG. 5, and therefore, will not be described.

As in step S5.2.1 and steps S5.2.1.1-S5.2.1.3 of FIG. 5, the browser of the client terminal 102 checks the thumbnail index file on a regular basis in step S6.2.1, and downloads and displays a thumbnail image on a preview list screen 600 in steps S6.2.1.1-S6.2.1.3. The preview list screen 600 displays an obtained thumbnail image 610. If the thumbnail image 610 is pressed down, the preview list screen 600 displays the preview screen 500 on which an image has been rendered from corresponding web filled-in form data. When a thumbnail image has been obtained and corresponding web filled-in form data has not completely been obtained, the browser displays an image (620, 630) indicating a wait for obtaining the web filled-in form data, on the preview list screen 600, and does not display the preview screen 500 even when the thumbnail image is pressed down. For example, a thumbnail image may be generated in parallel with web filled-in form data. For example, it is desirable that a thumbnail should be generated in parallel with generation of web filled-in form data, on a per unit basis, where the unit is the same as that for generation of web filled-in form. If web filled-in form data is generated on a per page basis, one page of a thumbnail image is generated while one page of web filled-in form data is generated. If the progress of generation of web filled-in form data is synchronous with the progress of generation of thumbnails, a page indicated by a thumbnail on the client terminal 102 can be immediately downloaded.

Filled-In Form Data Process Performed by Filled-In Form Service

The processes performed by the servers and the client described above with reference to FIGS. 4 and 5 will be described again with reference to FIGS. 8A-10. Firstly, the filled-in form data process performed by the filled-in form service will be described with reference to FIG. 8A.

Figure 8A:
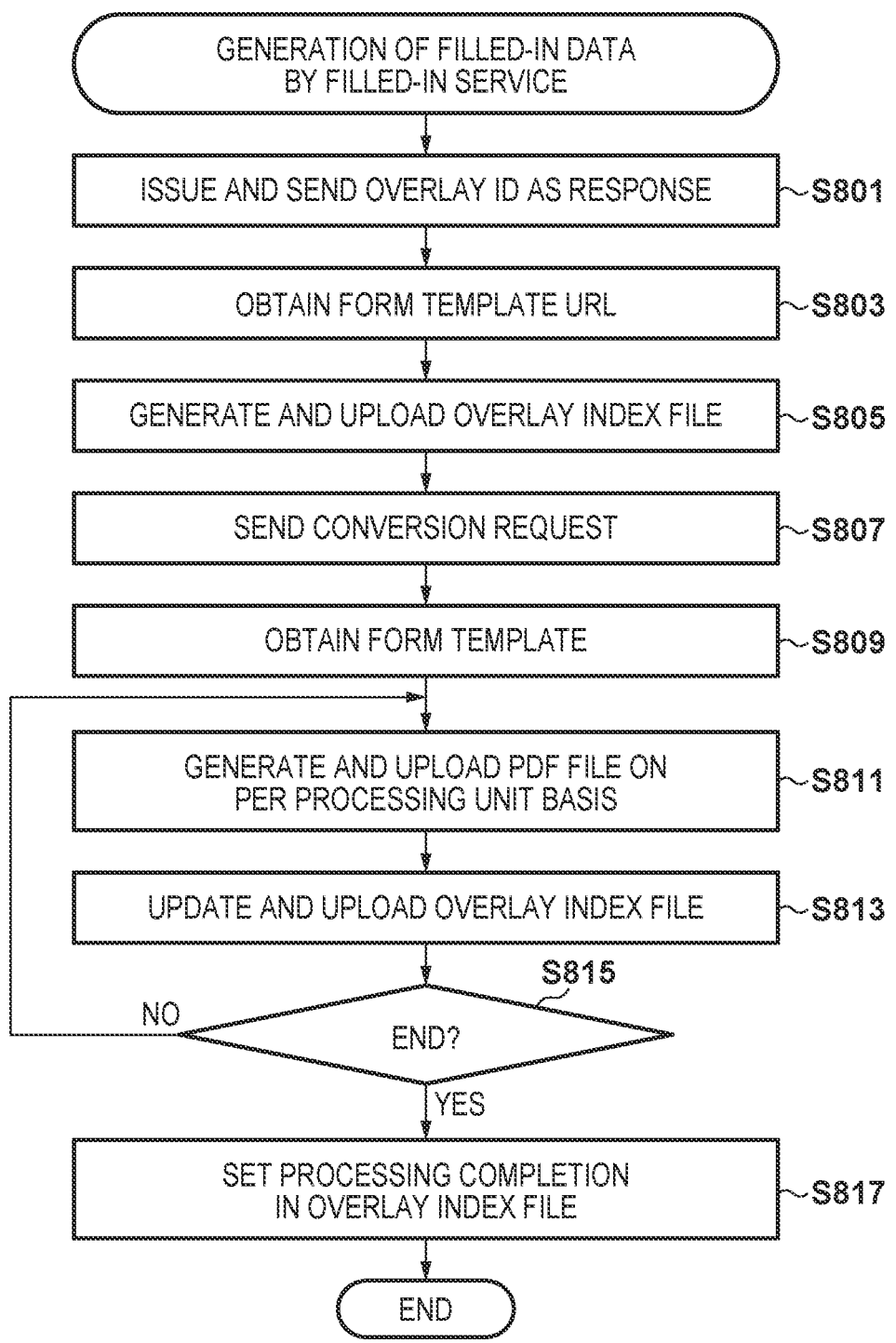
FIG. 8A is a flowchart showing a filled-in form data generation process performed by a filled-in form service.
Figure 8B:
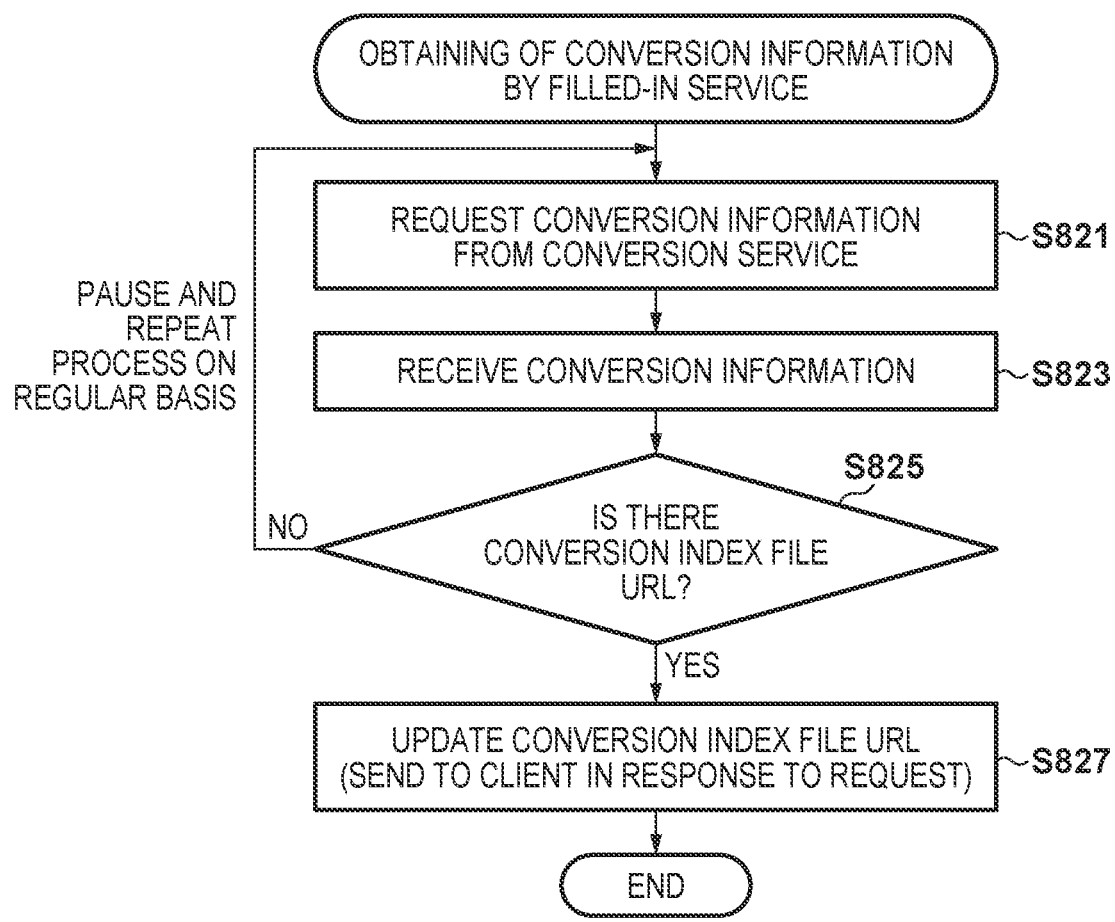
FIG. 8B is a flowchart of a conversion information obtaining process performed by a filled-in form service.

FIG. 8A is a flowchart of a procedure performed by the filled-in form service 104, e.g., a flow of a program executed by the CPU 202. In the description that follows, an entity that performs this procedure is referred to as a filled-in form service. However, as shown in FIG. 7, each step may be performed by a different software module.

When a user selects one from a list of items of unfilled-in form information, the browser 721 sends a filled-in form preview request to the business server 103, which then sends a filled-in form generation request to the filled-in form service 104. The procedure of FIG. 8A is started in response to the reception of the filled-in form generation request.

The filled-in form service 104, when receiving the filled-in form generation request, issues and puts an overlay ID into the filled-in form data information, and sends the overlay ID as a response (step S801). The overlay ID is sent to the client terminal. The filled-in form service 104 also obtains a form template URL from the form template information on the basis of a form template ID contained in the filled-in form generation request (step S803). The filled-in form service 104 generates and uploads an overlay index file 300 to the storage service 106 (step S805), and sends a conversion request containing the data URL (overlay index file URL) of the uploaded overlay index file 300 to the conversion service 105 (step S807). The filled-in form service 104 also accesses the form template URL to obtain form template data (step S809), and starts an overlay process using the form template data in combination with customer information.

The filled-in form service 104 combines form data contained in the form template data with, for example, field data (also referred to as business data) for each customer, to generate filled-in form data in the PDF format on a per processing unit basis, where the processing unit, for example, is one page, and uploads the filled-in form data to the storage service 106 (step S811). The filled-in form service 104 adds the data URL of the uploaded PDF file to the datalist, uploads the resultant overlay index file, and performs updating (step S813). Next, the filled-in form service 104 determines whether or not the instructed filled-in form data generation has been ended (i.e., an overlay process has been completed for all field data to be processed) (step S815). If the determination result is negative, the process is repeated, from step S811, on field data that has not yet been processed. If the determination result is positive, the filled-in form service 104 sets the process completion flag to "true" that is a value indicating the completion as in the overlay index file 330, and uploads the overlay index file to the storage service 106 (step S817).

According to the above procedure, the filled-in form service 104 combines form data with field data to generate filled-in form data, and uploads the filled-in form data to the storage service 106, in a per predetermined processing unit basis.

Conversion Information Obtaining Process Performed by Filled-In Form Service

Meanwhile, the filled-in form service 104 receives a conversion ID as a response to the conversion request sent in step S807. The filled-in form service 104 performs a process shown in FIG. 8B in response to the reception of the conversion ID. The filled-in form service 104 requests conversion information from the conversion service 105 using the conversion ID as a key (step S821), and receives the conversion information (step S823). The filled-in form service 104 determines whether or not there is a value in the conversion index file URL field of the received conversion information (step S825). If the determination result is positive, the filled-in form service 104 updates a corresponding conversion index file URL in the filled-in form data information (step S827). If the determination result is negative, the request is sent again to the conversion service 105 after a predetermined time lapse, for example. The conversion index file URL thus obtained is transferred to the client terminal 102 in response of a filled-in form data information update request from the client terminal 102.

According to the above procedure, conversion information that contains an overlay index file URL and a conversion index file URL, which are associated with each other, can be obtained from the conversion service 105 and provided to a client.

Web Filled-In Form Data Generation Process Performed by Conversion Service

Figure 9:
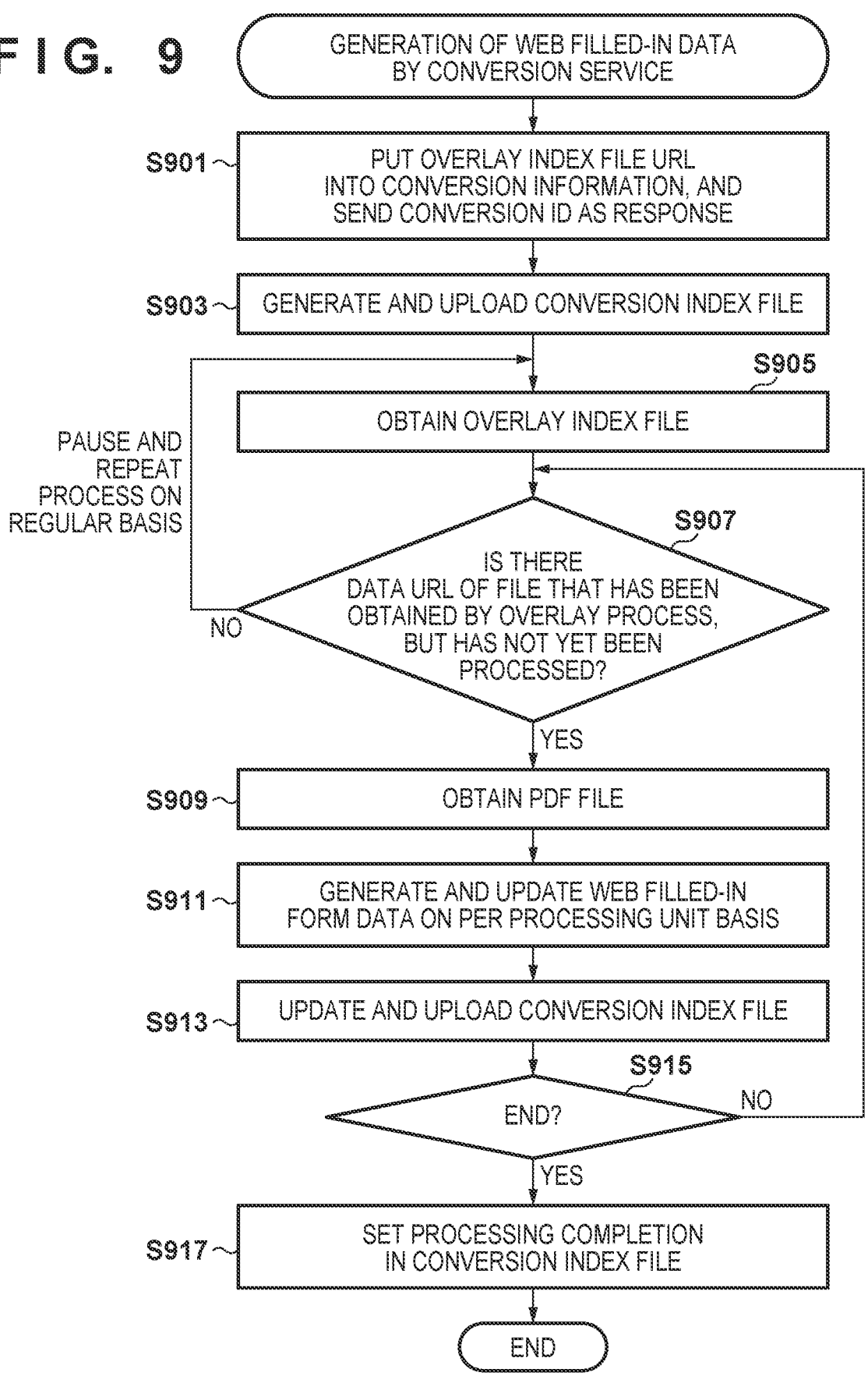
FIG. 9 is a flowchart showing a web filled-in form data generation process performed by a conversion service.

After receiving the conversion request from the filled-in form service 104 in step S807 of FIG. 8A, the conversion service 105 performs a process shown in FIG. 9 to generate web filled-in form data. The conversion service 105 issues and sends a conversion ID as a response to the conversion request, and puts the conversion ID and the received overlay index file URL together into the conversion information (step S901). The conversion service 105 also generates a conversion index file 300 in an initial state, uploads the conversion index file 300 to the storage service 106, and puts the data URL of the conversion index file 300 into the conversion information (step S903).

Thereafter, the conversion service 105 accesses the overlay index file URL contained in the conversion request involved in this process, and downloads an overlay index file, on a regular basis (step S905). The conversion service 105 references the obtained overlay index file to determine whether or not there is, in the datalist, any data URL that is of a PDF file that has been obtained by an overlay process, but has not yet been processed by a conversion process (step S907). If the determination result is positive, the conversion service 105 obtains, from the data URL, a PDF file that is filled-in form data (step S909). The conversion service 105 also converts the obtained PDF file into data in the web filled-in form format, and uploads the generated data in the web filled-in form format to the storage service 106 (step S911). The conversion service 105 also adds the data URL of the uploaded file to the datalist, and uploads the conversion index file thus updated (step S913). Note that, in order to determine, in step S907, whether or not filled-in form data has already been processed by a conversion process, a data URL thereof may be marked, for example.

In step S915, the conversion service 105 references the process completion flag of the overlay index file to determine whether or not the conversion of filled-in form data designated by the conversion request has been completed (i.e., ended). If the determination is positive, the conversion service 105 sets the process completion flag of the conversion index file to "true" (step S917).

Meanwhile, if the determination result in step S907 is negative (no data URL satisfying the condition), the process proceeds to step S905. Step S905 is performed on a regular basis by, for example, setting a timer to a predetermined time and then pausing the process of FIG. 9.

Thus, an overlay index file indicating the progress of generation of filled-in form data is obtained on a regular basis, and if a portion of the filled-in form data has been newly generated, such a portion can be obtained and converted into web filled-in form data. As a result, the generation of filled-in form data, and the conversion of filled-in form data into web filled-in form data, can be performed in parallel as though they were processed by a pipeline.

Web Filled-In Form Data Polling Process Performed by Client Terminal

Figure 10:
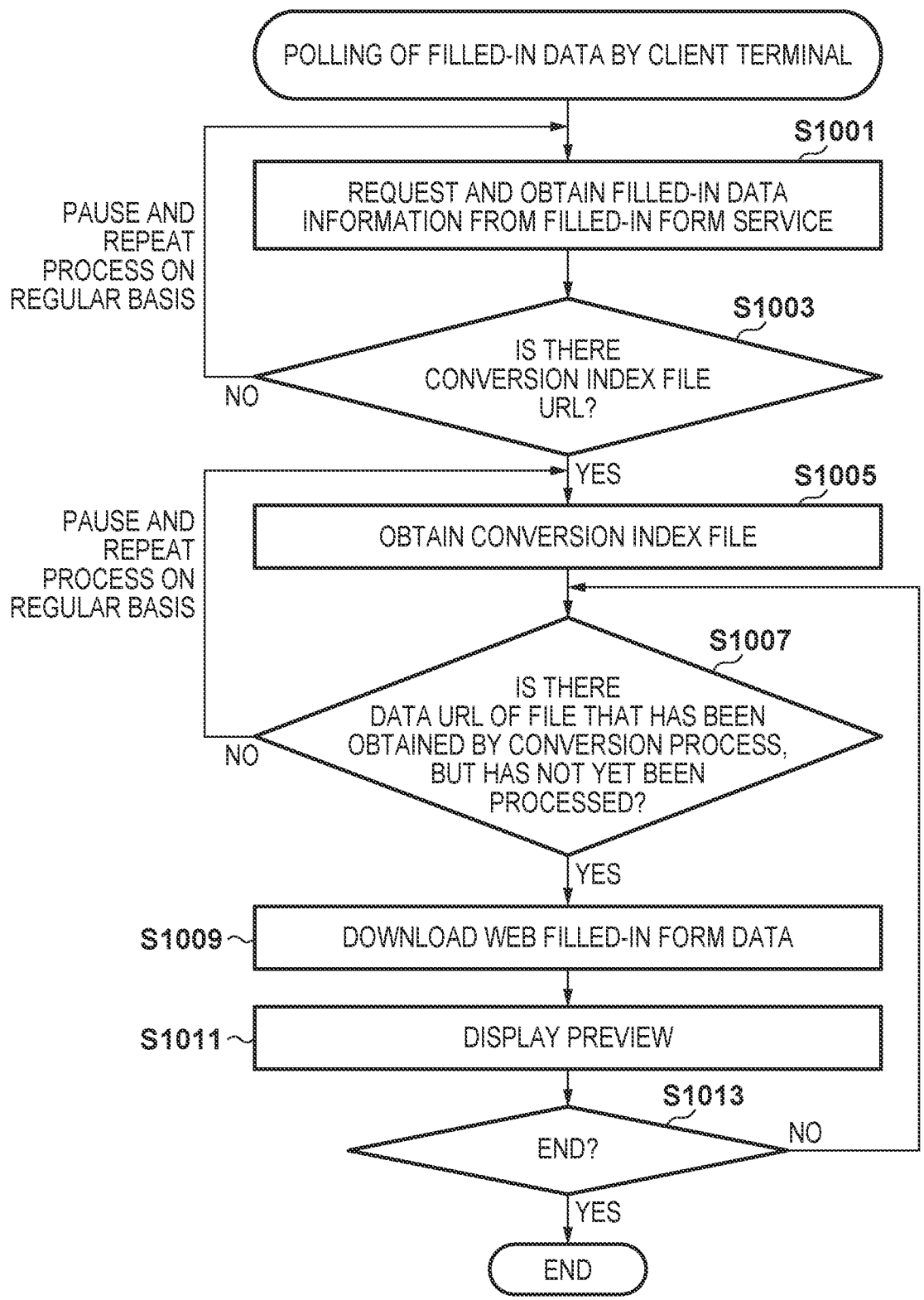
FIG. 10 is a flowchart showing a web filled-in form data polling process performed by a client terminal.

FIG. 10 is a flowchart showing a procedure that is performed by a client terminal for obtaining web filled-in form data generated by conversion. The client terminal 102 (particularly, the browser 721) requests the filled-in form data information from the filled-in form service 104, and obtains the filled-in form data information as a response from the filled-in form service 104, on a regular basis (step S1001). The filled-in form service 104 determines whether or not the obtained filled-in form data information contains the conversion index file URL obtained in step S827 (step S1003). If the determination result is positive, the client terminal 102 accesses the conversion index file URL, and downloads and references the conversion index file, on a regular basis (step S1005). The client terminal 102 determines whether or not the obtained conversion index file contains any data URL that is of unprocessed web filled-in data (step S1007). If the determination result is positive, the client terminal 102 downloads web filled-in form data from the data URL (step S1009), and displays the web filled-in form data on the preview screen 500 (step S1011). The client terminal 102 checks the process completion flag of the obtained conversion index file (step S1013), and if the process completion flag is "true" that indicates the completion of the process, ends the process.

Meanwhile, if the determination result in step S1003 is negative (the filled-in form data information does not contain a conversion index file URL), the process is paused, and after a predetermined time lapse, the filled-in form data information is obtained again in step S1001. If the determination result in step S1007 is negative (the obtained conversion index file does not contain a data URL that is of unprocessed web filled-in form data, step S1005 is performed again after a predetermined time lapse to obtain the conversion index file.

According to the above procedure, the client terminal 102 monitors the progress of generation of web filled-in form data on the basis of the conversion index file indicating the progress of generation of web filled-in form data, and downloads a portion of web filled-in form data that has been generated. Therefore, each portion of web filled-in form data can be used immediately after that portion have been generated, without waiting for the completion of generation of the entire web filled-in form data. Therefore, the waiting time for web filled-in form data to be obtained can be reduced.

In this example, by performing the flows of FIGS. 4 and 5 as described above, the overlay process in the filled-in form service 104 and the process of conversion into web filled-in form data in the conversion service 105 can be performed in parallel. As a result, the waiting time until the displaying of the preview screen 500 is started after a user presses down the filled-in form preview button 430 of the browser 721 can be reduced. This is particularly advantageous, especially when there are a huge number of pages.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-181938, filed Sep. 16, 2016, which is hereby incorporated by reference herein in its entirety.

What is claimed is:

1. An information processing system including an image processing apparatus and a client having a web browser, where the information processing apparatus comprises:
at least one memory which stores at least one program therein; and
at least one processor which executes the at least one program to cause the information processing apparatus to function as:
a reception unit configured to receive a filled-in form preview request from the client;
a filled-in form generation service configured to, in response to the received filled-in form preview request, generate filled-in form data in a PDF (Portable Document Format) format to be processed based on a form template, on a per page basis, and add information indicating a location of the generated page of the filled-in form data in the first PDF format into a first index file, wherein until the final page, the filled-in form generation service repeats generating the filled-in form data of each page and adding the information indicating the location of the generated page into the first index file;
a conversion service configured to check the first index file on a regular basis, convert the page of the filled-in form data in the PDF format of which the location is indicated by the first index file generated by the filled-in form generation service into web filled-in form data in a SVG (Scalable Vector Graphics) format if an unprocessed page remains, on the page basis, and add information indicating a location of the converted page of the web filled-in form data in the SVG format into a second index file, wherein until the final page, the conversion service repeats converting the page of the filled-in form data and adding the information indicating the location of the converted page into the second index file; and
wherein
the client accesses refers to the second index file on a regular basis, obtains the converted page of the web filled-in form data in the SVG format of which the location is indicated by the second index file provided by the conversion service if an unprocessed page remains, on the page basis, and displays the obtained page of the web filled-in form data in the SVG format as a preview of the filled-in form data in the PDF format using the web browser, and
the client downloads the page of the filled-in form data in the PDF format corresponding to the page of the web filled-in form data in the SVG format displayed as the preview of the filled-in form data in the PDF format to use the downloaded page.

2. The information processing system according to claim 1, wherein
the conversion service is further configured to generate a thumbnail from the filled-in form data in the PDF format, together with the web filled-in form data in the SVG format, the thumbnail being generated in parallel with generation of the web filled-in form data in the SVG format on the processing unit basis, and
the client obtains the web filled-in form data in the SVG format and the thumbnail, and if the client obtains the thumbnail but has not yet obtained the web filled-in form data corresponding to the obtained thumbnail, then in response to an instruction to display a preview image of the filled-in form data via the thumbnail the client displays an image indicating that the client is waiting to obtain the web filled-in form data in the SVG format.

3. The information processing system according to claim 1, wherein
when the conversion service obtains, from the first index file information indicating the storage location of a processing unit of the filled-in form data in the PDF format that has not yet been converted into the SVG format, the conversion service obtains and converts the filled-in form data in the PDF format that has not yet been converted into the SVG format by the conversion service, into web filled-in form data in the SVG format on the processing unit basis.

4. The information processing system according to claim 2, wherein
when the client obtains, from the second index file, information indicating the storage location of a processing unit of the web filled-in form data in the SVG format that has not yet been obtained, the client obtains the web filled-in form data in the SVG format that has not yet been obtained by the client.

5. A method for controlling an information processing system including an image processing apparatus and a client having a web browser, the information processing apparatus including a filled-in form generation service and a conversion service the method comprising:
receiving a filled-in form preview request from the client;
in response to the received filled-in form preview request, the filled-in form generation service generating filled-in form data in a PDF (Portable Document Format) format to be processed based on a form template, on a per page basis, and adding information indicating a location of the generated page of the filled-in form data in the PDF format into a first index file, wherein until the final page, the filled-in form generation service repeats generating the filled-in form data of each page and adding the information indicating the location of the generated page into the first index file;
the conversion service checking the first index file on a regular basis, converting the page of the filled-in form data in the PDF format of which the location is indicated by the first index file generated by the filled-in form generation service into web filled-in form data in a SVG (Scalable Vector Graphics) format if an unprocessed page remains, on the page unit basis, and adding information indicating a location of the converted page of the web filled-in form data in the SVG format into a second index file, wherein until the final page, the conversion service repeats converting the page of the filled-in form data and adding the information indicating the location of the converted page into the second index file;
the client accesses the second index file on a regular basis, obtaining the converted page of the web filled-in form data in the SVG format of which the location is indicated by the second index file provided by the conversion service if an unprocessed page remains, on the page basis, and displaying the obtained page of the web filled-in form data in the SVG format as a preview of the filled-in form data in the PDF format using the web browser; and
the client downloads the page of the filled-in form data in the PDF format corresponding to the page of the web filled-in form data in the SVG format displayed as the preview of the filled-in form data in the PDF format to use the downloaded page.

* * * * *